UNITED STATES PATENT OFFICE.

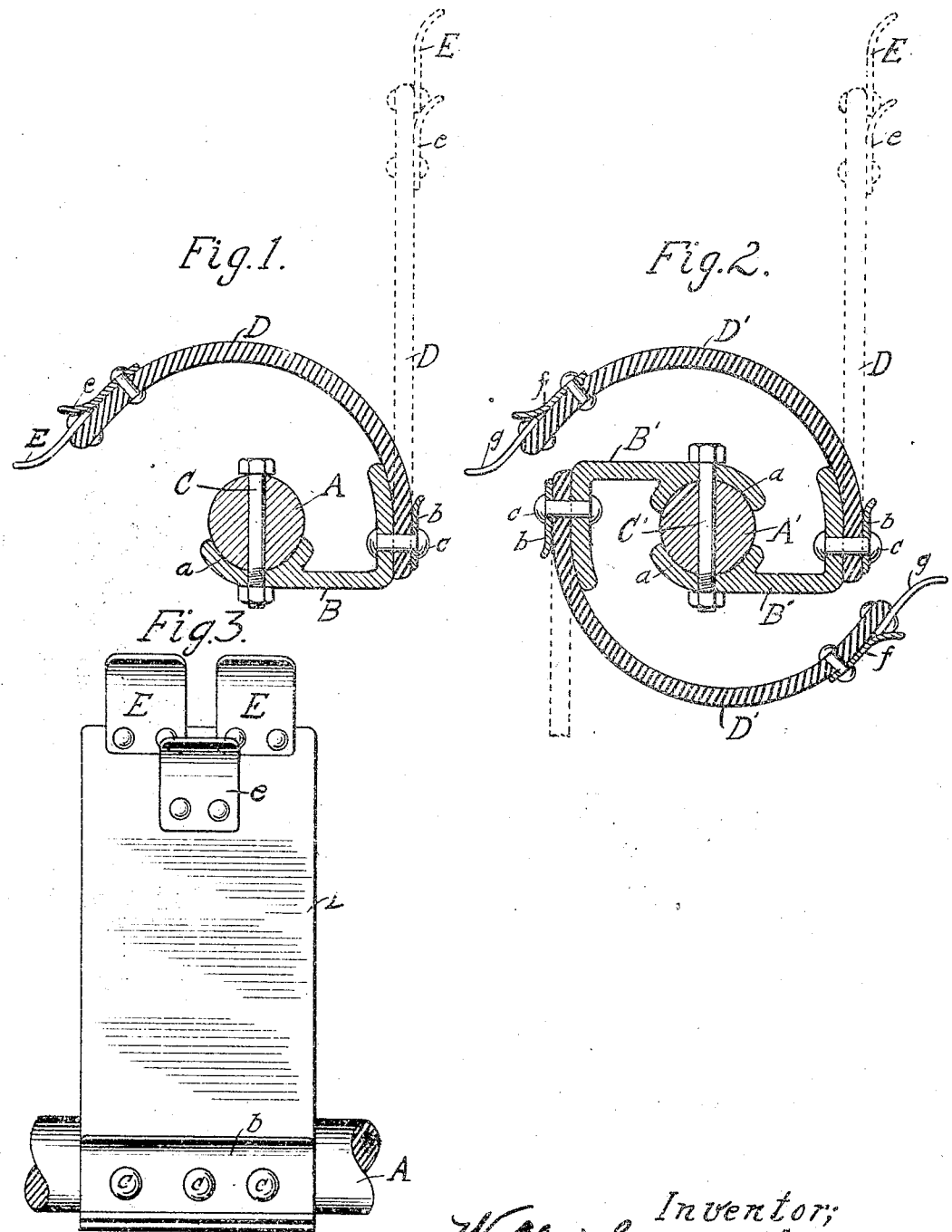

WALTER GUSSENHOVEN, OF CHICAGO, ILLINOIS.

BEATER FOR HOG-SCRAPING MACHINES.

938,761. Specification of Letters Patent. Patented Nov. 2, 1909.

Application filed March 15, 1909. Serial No. 483,495.

*To all whom it may concern:*

Be it known that I, WALTER GUSSENHOVEN, a citizen of the United States, and a resident of Chicago, in the county of Cook and State of Illinois, have invented certain new and useful Improvements in a Beater for Hog-Scraping Machines, of which the following is a clear, full, and exact description.

My invention relates to hog scraping machines which comprise a suitable carrier for conveying the hog carcass from the hot water vat through a steam-chamber, and a series of revolving beaters each of which is made of strips of thick rubber belting having one end secured to a revolving shaft, and the other free end provided with metal scrapers that whip the carcass and scrape the bristles off of the same. Beaters so constructed seem to possess, to a much greater extent than when constructed in any other manner, those characteristics that make the machine a success, and are satisfactory in every respect except that of durability. Heretofore the life of these beaters has been very limited, owing to the sharp bends they are compelled to describe in order to automatically adapt themselves to scrape all parts of a large as well as a small carcass while in transit past the same.

The object of my invention is to provide a beater that will not, when in operation, have to bend or describe a very sharp curve and will therefore, not be liable to the severe breaking strain to which it has heretofore been subject, and will last twice to three times as long substantially as hereinafter fully described and as particularly pointed out in the claims.

In the drawings:—Figure 1 is an edge view of my invention showing the preferred form of the same. Fig. 2 is a similar view of a slightly modified form of the same. Fig. 3 is a side view of Fig. 1 when the beater is in a straight or flat position.

Referring to Fig. 1 of the drawings A represents a suitable shaft, which is arranged in a plane parallel and adjacent to the carrier (not shown) of a hog scraping machine, and B represents a bracket, one end portion of which is provided with a concave bearing surface or saddle $a$, which is secured to said shaft A by means of a bolt and nut C. The bracket B is L-shaped, and the portion thereof connected to the saddle $a$ projects tangentially to shaft A, and the outer portion of this bracket is bent at an angle, say, ninety degrees, to said tangential portion, back opposite the shaft, and is preferably bent to conform to a curve struck from the center of shaft A. This outer angular portion of the bracket has one end of a beater D secured thereto which extends in a plane transverse to said shaft and consists of an elastic flexible strap or plate, the secured end of which is held against the outer surface of the outer portion of the bracket, by means of a clamping-plate $b$, and rivets $c$ that pass through said plate, beater and bracket substantially as shown in the drawings. This beater is, preferably, slightly more than twice as long as it is wide, and its outer end portion is provided on its outer surface with scrapers E and $e$, that consist of rectangular metal plates, two of which E, E, being so placed that they project beyond the outer end edge of the beater and have their own outer edges bent slightly away from the shaft C. These scrapers, E, are placed a slight distance apart and a corresponding scraper $e$ is secured to the beater back a distance from its outer edge, in a plane mediate scrapers E, E, so as to follow after them and scrape the portions of the carcass that may pass between and not be touched by scrapers E, E.

In Fig. 2 I show a slightly modified form of my invention in which two brackets B', B', are secured to shaft A' at points diametrically opposite each other by a bolt and nut C'. The brackets B', B', have beaters D', D', secured thereto, and these beaters have scrapers $f$ and $g$ secured to the outer end portion thereof, and these brackets, the beaters and scrapers are constructed substantially the same in every respect as the corresponding parts in the preferred form shown in Fig. 1.

The beaters are generally made of very heavy belting, consisting of a ten ply rubber and canvas ducking fabric, and when new said beaters are comparatively stiff and when bent are able to resume the position shown in dotted lines in Figs. 1 and 2 of the drawing. When, however, these beaters have been used for a while, their contact with large and small carcasses of varying diameters, carried past them, bends them back from the direction in which they are revolved, and, sooner or later they acquire a permanent bend or "set," and when in this condition it is subjected to a sharp bend, which injures the belting fabric, and cracks and breaks it at a point adjacent to the extremity of the bracket. When this happens they become useless. Generally speaking, the beaters have heretofore been secured directly to the shaft, and it will be observed that in order to engage a large carcass, whose dimensions are such that as it passes the beater it is within three or four inches of the shaft, the beater must take a very sharp bend, and it does not take very long before the beater cracks. This short bend must in this instance be made within the space between the circumference of the shaft and the carcass, while by my improvement the curvature of the bend the beater will have to describe under similar conditions will not be less than that of a circle struck from the center of the shaft whose radius extends from said center to the surface of the carcass. When the beater is constructed in accordance with my invention, therefore, the elastic fabric does not acquire a "set" immediately, but remains elastic for a greater length of time and is not subjected to as great strain, and the life therefore of the beater is much greater than those heretofore in use.

I do not wish to be confined to the exact shape of the means hereinbefore described for securing the ends of the beaters to the shaft, because it is obvious that these could be changed without departing from the spirit of my invention.

What I claim as new is:—

1. In a hog scraping machine the combination with a shaft, of means suitably secured to said shaft and having a portion bent in a direction opposite to the rotation of said shaft, and a beater one end of which is attached to said bent portion of said means and is provided with scrapers at its opposite free end.

2. In a hog scraping machine the combination with a shaft, of a bracket suitably secured to said shaft and having a portion bent in a direction opposite to the rotation of said shaft, and a beater one end of which is attached to the outer portion of said bracket and is provided with scrapers at its opposite free end.

3. In a hog scraping machine the combination with a shaft, of an L-shaped arm or bracket, one member of which is secured to and projects from said shaft, and a flexible beater one end of which is secured to the outer surface of the outer laterally bent portion of the bracket which extends at an angle to the portion thereof secured to the shaft.

4. In a hog scraping machine the combination with a shaft, of an L-shaped bracket, one end of one portion of which is provided with a saddle having a concaved surface from which said bracket projects tangentially to said shaft, and the outer portion of which extends at an angle thereto and is substantially concentric with the shaft, and a flexible beater one end of which is secured to the outer surface of the last-mentioned portion of the bracket.

5. In a hog scraping machine the combination with a shaft, of a bracket one end portion of which is secured to and projects from said shaft and the opposite portion extends at an angle to said first-mentioned portion at a suitable distance from said shaft, and a flexible beater one end of which is secured to said latter portion.

6. In a hog scraping machine the combination with a shaft, of a bracket one end of which is secured to said shaft and the other end of which is turned in a direction opposite to the rotation of said shaft, and a flexible beater having one end secured to the outer end of said bracket.

7. In a hog scraping machine the combination with a shaft, of a bracket one arm of which is secured to and projects tangentially from said shaft and an arm extending at an angle to said first mentioned arm at a suitable distance from said shaft, and a flexible beater one end of which is secured to said latter arm.

8. In a hog scraping machine the combination with a shaft, of a bracket one end of which is provided with a saddle portion having a concaved surface that is secured to said shaft and the other end of which is turned in a direction opposite to the rotation of said shaft, and a flexible beater having one end secured to the outer end of said bracket.

9. In a hog scraping machine the combination with a shaft, of a bracket one arm of which is provided with a saddle portion having a concaved surface that is secured to said shaft, and an arm extending at an angle to said first-mentioned arm at a suitable distance from said shaft, and a flexible beater one end of which is secured to said latter arm.

10. In a hog scraping machine the combination with a shaft, of a bracket one arm of which projects tangentially from said shaft and is provided with a saddle portion having a concaved surface that is secured to said shaft, and an arm extending at an angle to said first-mentioned arm at a suitable distance from said shaft, and a flexible beater one end of which is secured to said latter arm.

11. In a hog scraping machine the combination with a shaft, of a bracket one arm of which is provided with a saddle portion having a concaved surface that is secured to said shaft, and an arm extending at right angles to said first-mentioned arm at a suitable distance from said shaft, and a flexible beater one end of which is secured to said latter arm.

In testimony whereof I have hereunto set my hand and seal this 10 day of March, A. D., 1909.

WALTER GUSSENHOVEN. [L. S.]

Witnesses:
  FRANK D. THOMASON,
  EDITH MARTIN.